US012766833B2

(12) United States Patent
Mori et al.

(10) Patent No.: US 12,766,833 B2

(45) Date of Patent: Oct. 20, 2026

(54) LIQUID EJECTING HEAD AND LIQUID EJECTING APPARATUS

(71) Applicant: SEIKO EPSON CORPORATION, Tokyo (JP)

(72) Inventors: Masaki Mori, Shiojiri (JP); Hitoshi Takaai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 160 days.

(21) Appl. No.: 18/783,551

(22) Filed: Jul. 25, 2024

(65) Prior Publication Data

US 2025/0033352 A1 Jan. 30, 2025

(30) Foreign Application Priority Data

Jul. 28, 2023 (JP) ................................ 2023-123136

(51) Int. Cl.
*B41J 2/14* (2006.01)
*B41J 2/045* (2006.01)

(52) U.S. Cl.
CPC ....... *B41J 2/14112* (2013.01); *B41J 2/04563* (2013.01); *B41J 2/14233* (2013.01); *B41J 2002/14491* (2013.01)

(58) Field of Classification Search
CPC .......... B41J 2002/14491; B41J 2/14233; B41J 2002/14354; B41J 2/04541; B41J 2/04581; B41J 2/04563; B41J 2/14201; B41J 2/04565; B41J 2/14153
See application file for complete search history.

(56) References Cited

U.S. PATENT DOCUMENTS

| | | | | |
|---|---|---|---|---|
| 12,377,650 | B2 * | 8/2025 | Shiozawa | B41J 2/04513 |
| 2004/0189752 | A1 * | 9/2004 | Satake | B41J 2/04588 347/68 |
| 2010/0194826 | A1 * | 8/2010 | Kondo | B41J 2/14233 347/71 |
| 2013/0083102 | A1 * | 4/2013 | Kondo | B41J 2/14209 347/9 |
| 2018/0134034 | A1 * | 5/2018 | Fukuda | B41J 2/04541 |
| 2018/0170051 | A1 * | 6/2018 | Nomura | B41J 2/0458 |
| 2018/0264807 | A1 * | 9/2018 | Ito | B41J 2/161 |
| 2022/0258472 | A1 | 8/2022 | Hirai et al. | |
| 2023/0018898 | A1 * | 1/2023 | Ide | B41J 2/04541 |
| 2023/0020830 | A1 * | 1/2023 | Yokoo | B41J 2/04563 |
| 2023/0249462 | A1 * | 8/2023 | Mori | B41J 2/14233 347/68 |

FOREIGN PATENT DOCUMENTS

| | | |
|---|---|---|
| JP | 2022-124599 A | 8/2022 |

* cited by examiner

*Primary Examiner* — John P Zimmermann
(74) *Attorney, Agent, or Firm* — WORKMAN NYDEGGER

(57) ABSTRACT

A liquid ejecting head includes a first detection resistor designed to change its resistance value depending on a temperature of the liquid inside the pressure chambers in the first pressure chamber line, a second detection resistor designed to change its resistance value depending on a temperature of the liquid inside the pressure chambers in the second pressure chamber line, a wiring board, a first coupling terminal that couples one end of the first detection resistor and one end of the second detection resistor in common to the wiring board, and a second coupling terminal that couples another end of the first detection resistor and another end of the second detection resistor in common to the wiring board.

13 Claims, 9 Drawing Sheets

LIQUID EJECTING HEAD AND LIQUID EJECTING APPARATUS

The present application is based on, and claims priority from JP Application Serial Number 2023-123136, filed Jul. 28, 2023, the disclosure of which is hereby incorporated by reference herein in its entirety.

BACKGROUND

1. Technical Field

The present disclosure relates to a liquid ejecting head and a liquid ejecting apparatus.

2. Related Art

JP-A-2022-124599 discloses a liquid ejecting head provided with a piezoelectric element, which includes a resistor with a wire disposed in the vicinity of a pressure chamber, the resistor being designed to change its resistance value in response to a change in temperature so as to detect a temperature of a liquid in the pressure chamber.

The resistor is wired in the vicinity of the pressure chamber and is therefore influenced by noise attributed to a drive current that flows on a driver wire for driving the piezoelectric element. Moreover, according to the technique disclosed in JP-A-2022-124599, the resistor is disposed in a meandering manner. For this reason, resistance of the resistor is increased along with an increase in wiring length. Hence, a value of a current flowing on the resistor is reduced accordingly. As a consequence, the degree of influence of the noise from the drive current on the current flowing on the resistor grows larger. While a larger current may be fed to the resistor in order to relatively reduce the influence of the noise, this method is not desirable in light of a possibility of causing a state of overvoltage. In this regard, there has been a demand for a technique for wiring a resistor in such a way as to reduce a resistance value thereof.

SUMMARY

An aspect of the present disclosure provides a liquid ejecting head. This liquid ejecting head includes: a pressure chamber substrate including a first pressure chamber line having a plurality of pressure chambers arranged in a first direction, and a second pressure chamber line having a plurality of pressure chambers arranged in the first direction, the first pressure chamber line and the second pressure chamber line being provided in such a way as to be arranged in a second direction intersecting with the first direction; a plurality of individual electrodes individually provided to the respective pressure chambers of the first pressure chamber line and the second pressure chamber line; at least one common electrode provided in common to the respective pressure chambers of the first pressure chamber line and the second pressure chamber line; piezoelectric bodies provided between the plurality of individual electrodes and the at least one common electrode, respectively, and driven in order to apply a pressure to a liquid inside the plurality of pressure chambers; a first detection resistor formed from an identical material to a material of at least any of the plurality of individual electrodes and the at least one common electrode, and designed to change a resistance value depending on a temperature of the liquid inside the plurality of pressure chambers included in the first pressure chamber line; a second detection resistor formed from the identical material to the material of at least any of the plurality of individual electrodes and the at least one common electrode, and designed to change a resistance value depending on a temperature of the liquid inside the plurality of pressure chambers included in the second pressure chamber line; a wiring board; a first coupling terminal that couples one end of the first detection resistor and one end of the second detection resistor in common to the wiring board; and a second coupling terminal that couples another end of the first detection resistor and another end of the second detection resistor in common to the wiring board.

DESCRIPTION OF EMBODIMENTS

A. Embodiment

Figure 1:
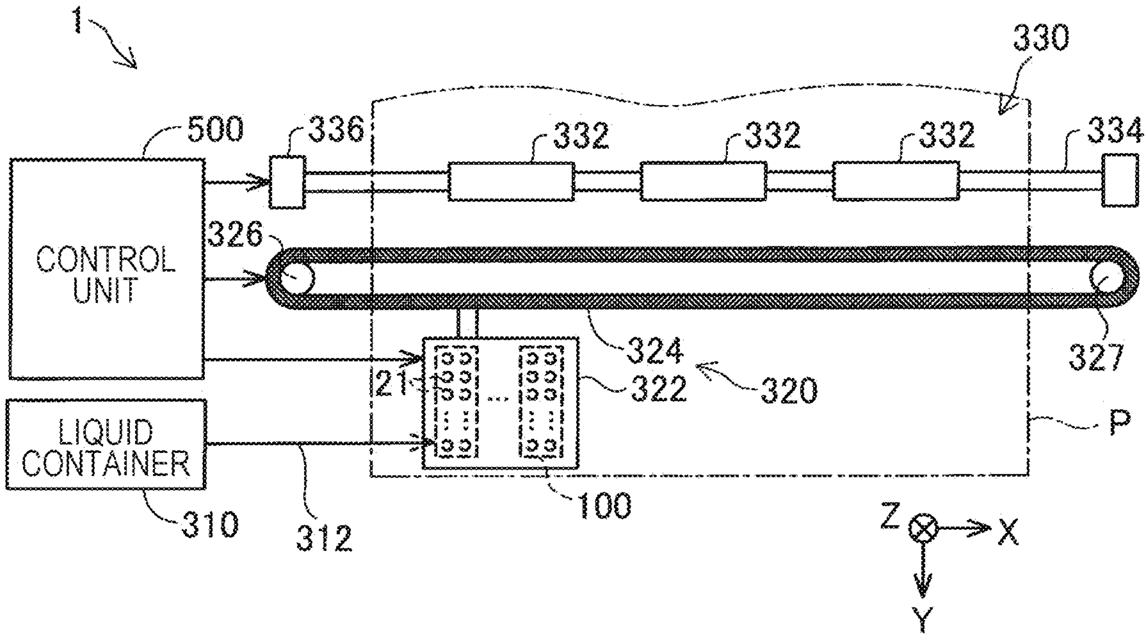
FIG. 1 is a schematic diagram illustrating a schematic configuration of a liquid ejecting apparatus.

FIG. 1 is a schematic diagram illustrating a schematic configuration of a liquid ejecting apparatus 1 including a liquid ejecting head 100. An xyz orthogonal coordinate system is set up in FIG. 1 in order to facilitate understanding. X axis and y axis extend along a horizontal plane while z axis extends in a vertical direction. Note that the above-mentioned definitions do not always apply depending on a direction of placement of the liquid ejecting apparatus 1. Orthogonality includes a range from 90°±10°. The xyz orthogonal coordinate system is also set up in the drawings from FIG. 2 on likewise.

The liquid ejecting apparatus 1 is an ink jet printer which ejects an ink as an example of a liquid, thereby printing an image on printing paper P being a medium. The medium being a target of ejection of the ink from the liquid ejecting apparatus 1 is not limited only to the printing paper P, but will also be any of plastics, films, fibers, fabrics, leather, metal, glass, wood, ceramics, and so forth.

The liquid ejecting apparatus 1 includes the liquid ejecting head 100 that ejects the liquid, a liquid container 310, a head movement mechanism 320, a transportation mechanism 330, and a control unit 500.

The liquid ejecting head 100 includes nozzles 21 for ejecting the liquid, and ejects the liquid supplied from the liquid container 310 onto the printing paper P. The nozzles 21 are arranged in the y-axis direction. Details of the structure of the liquid ejecting head 100 will be described later.

The liquid container 310 stores the liquid to be ejected from the liquid ejecting head 100. The liquid stored in the liquid container 310 is supplied to the liquid ejecting head 100 through a tube 312 made of a resin. The liquid container 310 is a liquid package in the form of a bag being formed from a flexible film, for example.

The head movement mechanism 320 includes a carriage 322 that mounts the liquid ejecting head 100, a driving belt 324 to which the carriage 322 is fixed, a movement motor 326 and a pulley 327 that reciprocate the driving belt 324 in a main scanning direction. By reciprocating the driving belt 324 in the main scanning direction, the movement motor 326 reciprocates the carriage 322 and the liquid ejecting head 100 in the main scanning direction. The main scanning direction includes +x direction and −x direction. A vertical scanning direction is a direction intersecting with the main scanning direction and includes +y direction and −y direction. In the illustrated example, the liquid is ejected in +z direction from the nozzles 21.

The transportation mechanism 330 includes three transportation rollers 332, a transportation rod 334 attaching the transportation rollers 332, and a transportation motor 336. The printing paper P is transported in the vertical scanning direction by causing the transportation motor 336 to rotate the transportation rod 334.

Figure 2:
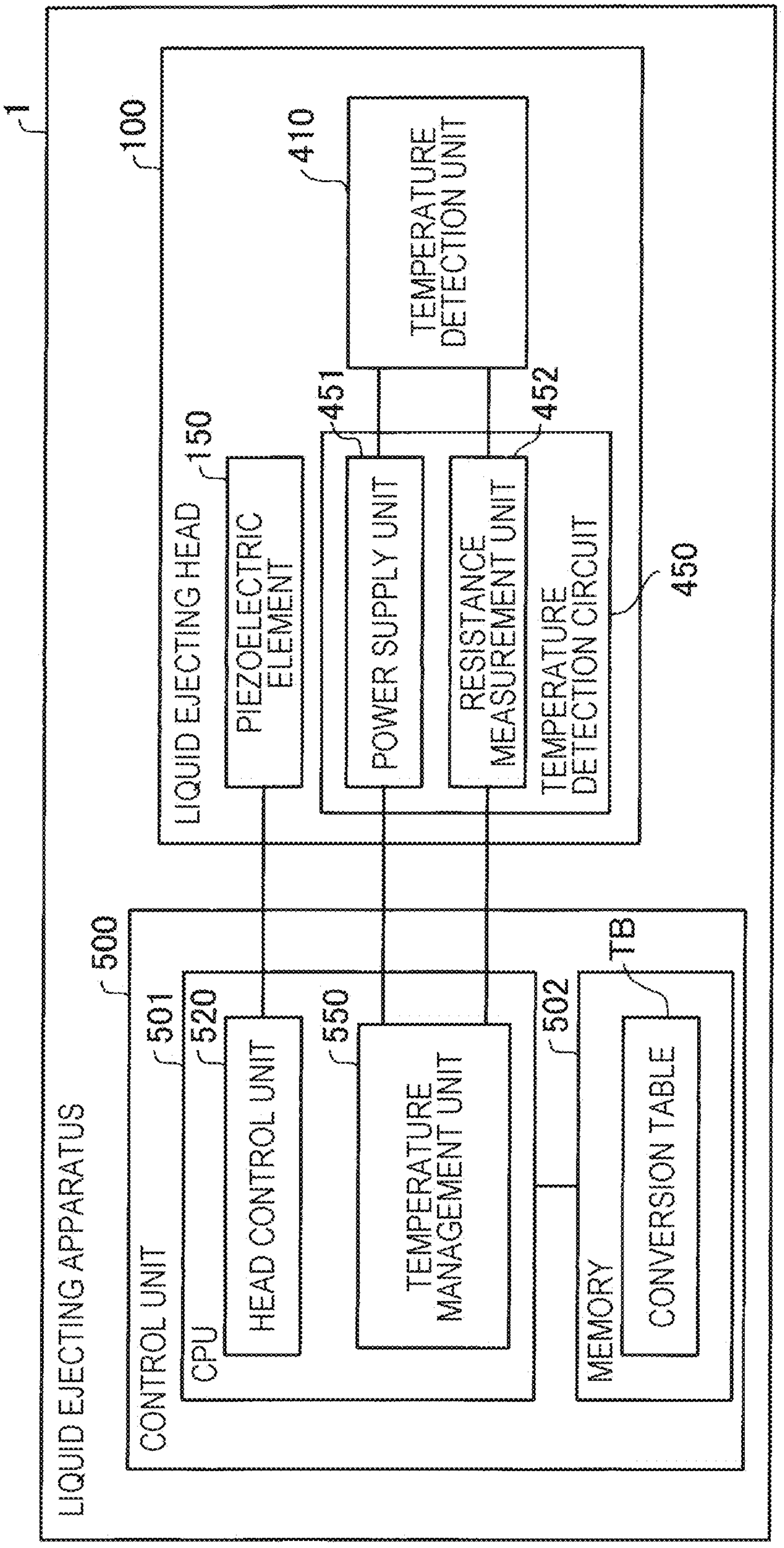
FIG. 2 is a block diagram illustrating a schematic configuration in light of functions of a control unit and a liquid ejecting head.

FIG. 2 is a block diagram illustrating a schematic configuration in light of functions of the control unit 500 and the liquid ejecting head 100. The liquid ejecting head 100 includes a piezoelectric element 150, a temperature detection unit 410, and a temperature detection circuit 450. A detailed configuration of the liquid ejecting head 100 will be described later. Here, the temperature detection circuit 450 may be provided outside the liquid ejecting head 100.

The piezoelectric element 150 is a driving element for applying a pressure to the liquid in the after-mentioned pressure chamber of the liquid ejecting head 100.

The temperature detection unit 410 is formed from resistance wiring used for temperature detection. In the present specification, the resistance wiring used for detecting the temperature will be referred to as a detection resistor. Details of the temperature detection unit 410 will be described later.

The temperature detection circuit 450 estimates the temperature of the liquid in the pressure chamber by using a characteristic of an electric resistance value of the resistance wiring made of a metal, a semiconductor, and the like, which varies with the temperature.

The temperature detection circuit 450 includes a power supply unit 451 and a resistance measurement unit 452. The power supply unit 451 is a constant-current circuit, for example. The power supply unit 451 feeds a constant current to the temperature detection unit 410 in accordance with control by a temperature management unit 550. The resistance measurement unit 452 acquires a resistance value of the detection resistor of the temperature detection unit 410 based on a current value of the constant current fed from the power supply unit 451 to the temperature detection unit 410, and voltage values at two ends of the detection resistor included in the temperature detection unit 410. The resistance measurement unit 452 outputs the acquired resistance value of the detection resistor of the temperature detection unit 410 to the temperature management unit 550. The resistance measurement unit 452 will also be referred to as a "resistance value acquisition unit".

The control unit 500 controls the entire liquid ejecting apparatus 1. The control unit 500 is a microcomputer that includes a central processing unit (CPU) 501 and a memory 502. Various programs to be executed by the CPU 501 are stored in the memory 502. Meanwhile, a conversion table TB to be described later is stored in the memory 502. The CPU 501 executes the programs stored in the memory 502, thus functioning as a head control unit 520 and the temperature management unit 550. Here, the control unit 500 may be realized by one or more processing circuits of a field programmable gate array (FPGA), an application specific integrated circuit (ASIC), and the like instead of the CPU.

The head control unit 520 controls a reciprocating operation of the carriage 322 along the main scanning direction and a transporting operation of the printing paper P along the vertical scanning direction. Moreover, the head control unit 520 controls ejection of the liquid onto the printing paper P by driving the piezoelectric element 150. In the present embodiment, the head control unit 520 determines a drive waveform for driving the piezoelectric element 150 based on the temperature of the liquid in the pressure chamber acquired from the temperature management unit 550, and drives the piezoelectric element 150 with a drive signal having the determined drive waveform. Accordingly, it is possible to drive the piezoelectric element 150 in accordance with the temperature of the liquid in the pressure chamber. The head control unit 520 will also be referred to as a "drive waveform determination unit".

The temperature management unit 550 acquires a temperature in the vicinity of the pressure chamber by using the resistance value of the detection resistor of the temperature detection unit 410 acquired from the resistance measurement unit 452 and using the conversion table TB. In the present embodiment, the temperature of the liquid in the pressure chamber can be detected by using the temperature in the vicinity of the pressure chamber thus acquired. For example, the acquired temperature in the vicinity of the pressure chamber may be treated as the temperature of the liquid in the pressure chamber. Alternatively, a value derived from the acquired temperature in the vicinity of the pressure chamber in accordance with a predetermined method may be treated as the temperature of the liquid in the pressure chamber. The conversion table TB includes information that represents a correspondence relation between the electric resistance value of the detection resistor and the temperature. The temperature management unit 550 outputs the acquired temperature of the liquid in the pressure chamber to the head control unit 520. Here, the temperature management unit 550 may compute the temperature of the liquid in the pressure chamber by using the resistance value of the detection resistor of the temperature detection unit 410 and a temperature computation formula that is stored in a storage unit 584 in advance. The temperature management unit 550 will also be referred to as a "temperature acquisition unit".

Figure 3:
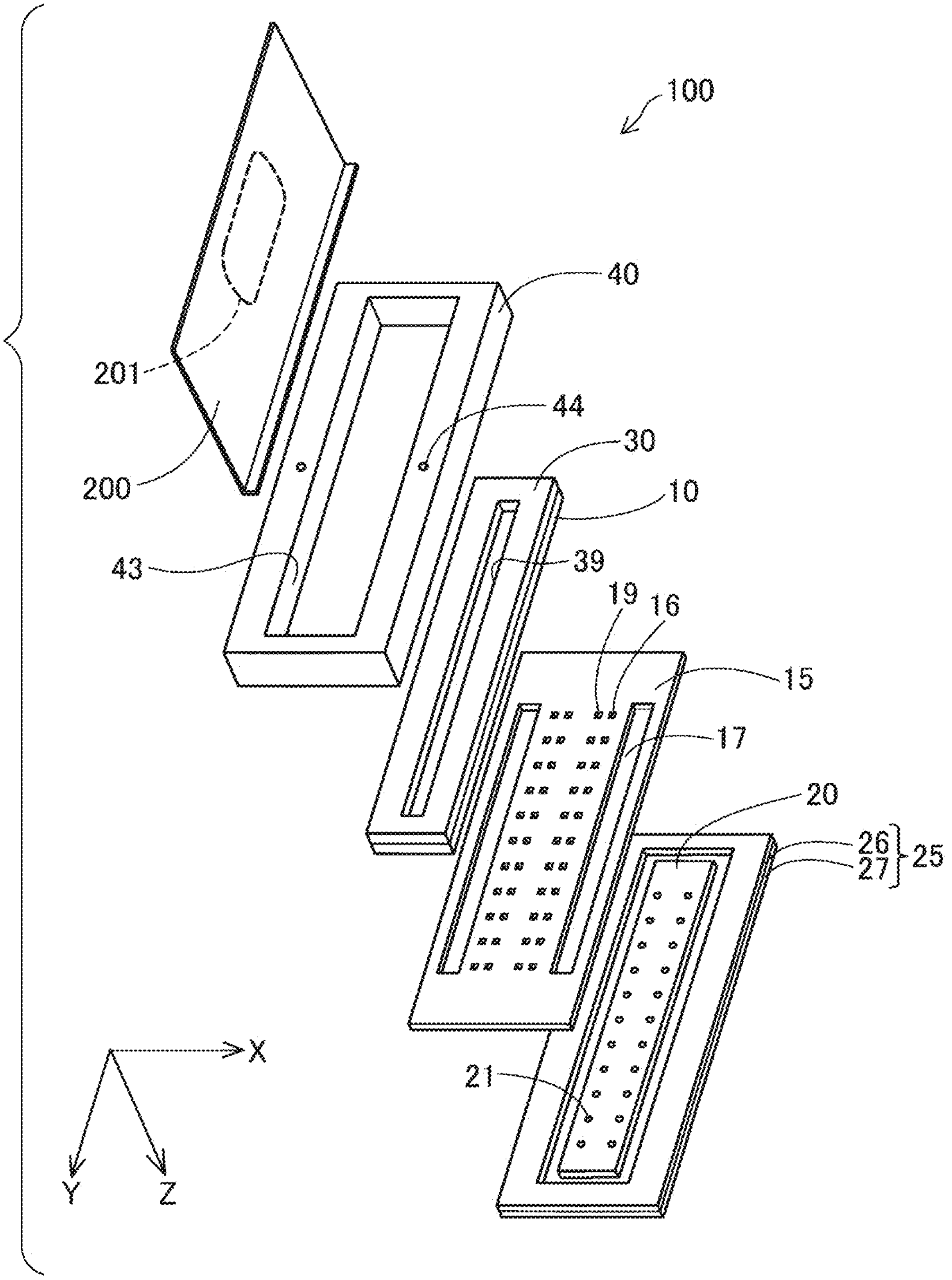
FIG. 3 is an exploded perspective view illustrating a configuration of the liquid ejecting head.
Figure 4:
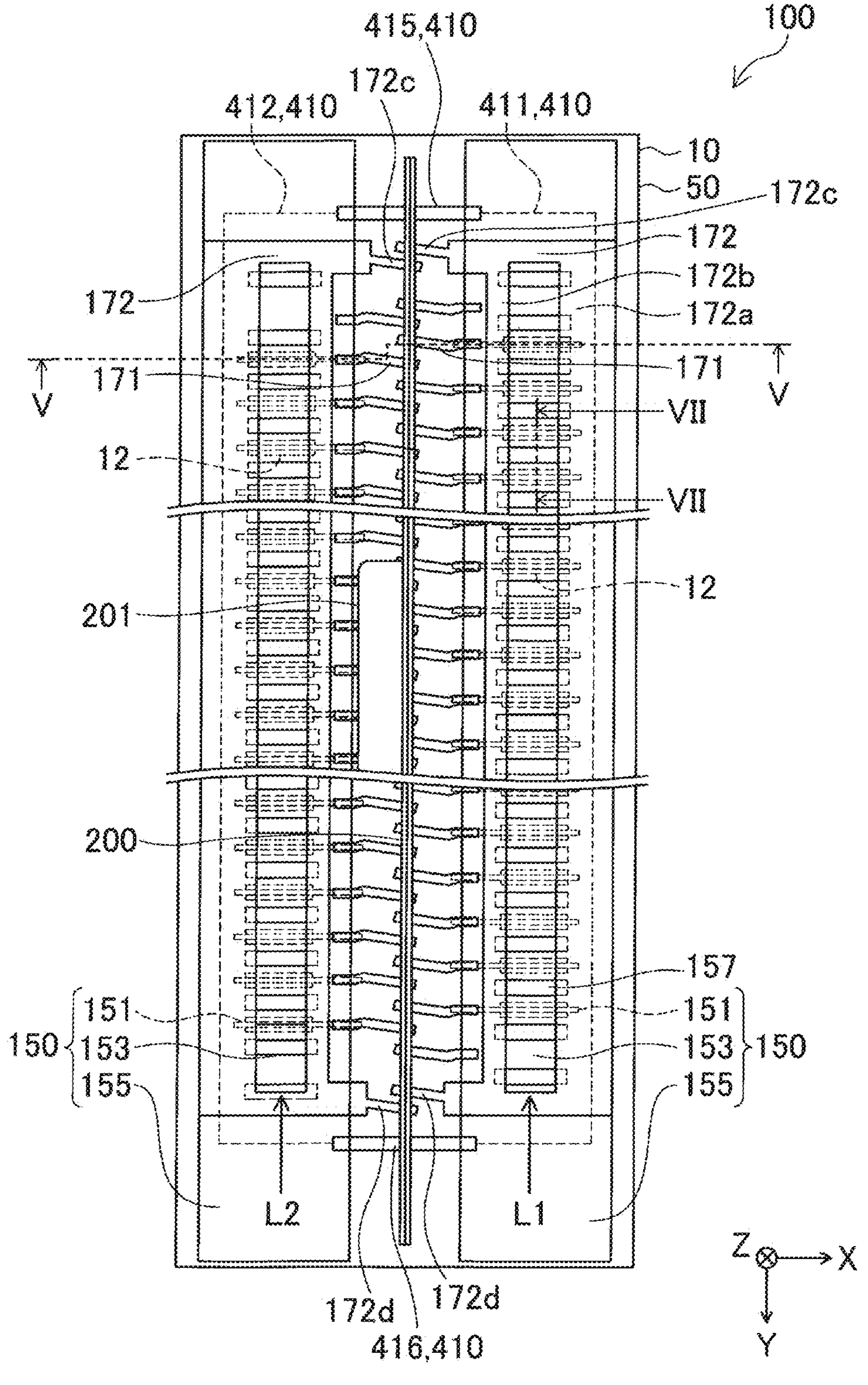
FIG. 4 is an explanatory diagram illustrating the configuration of the liquid ejecting head in plan view.
Figure 5:
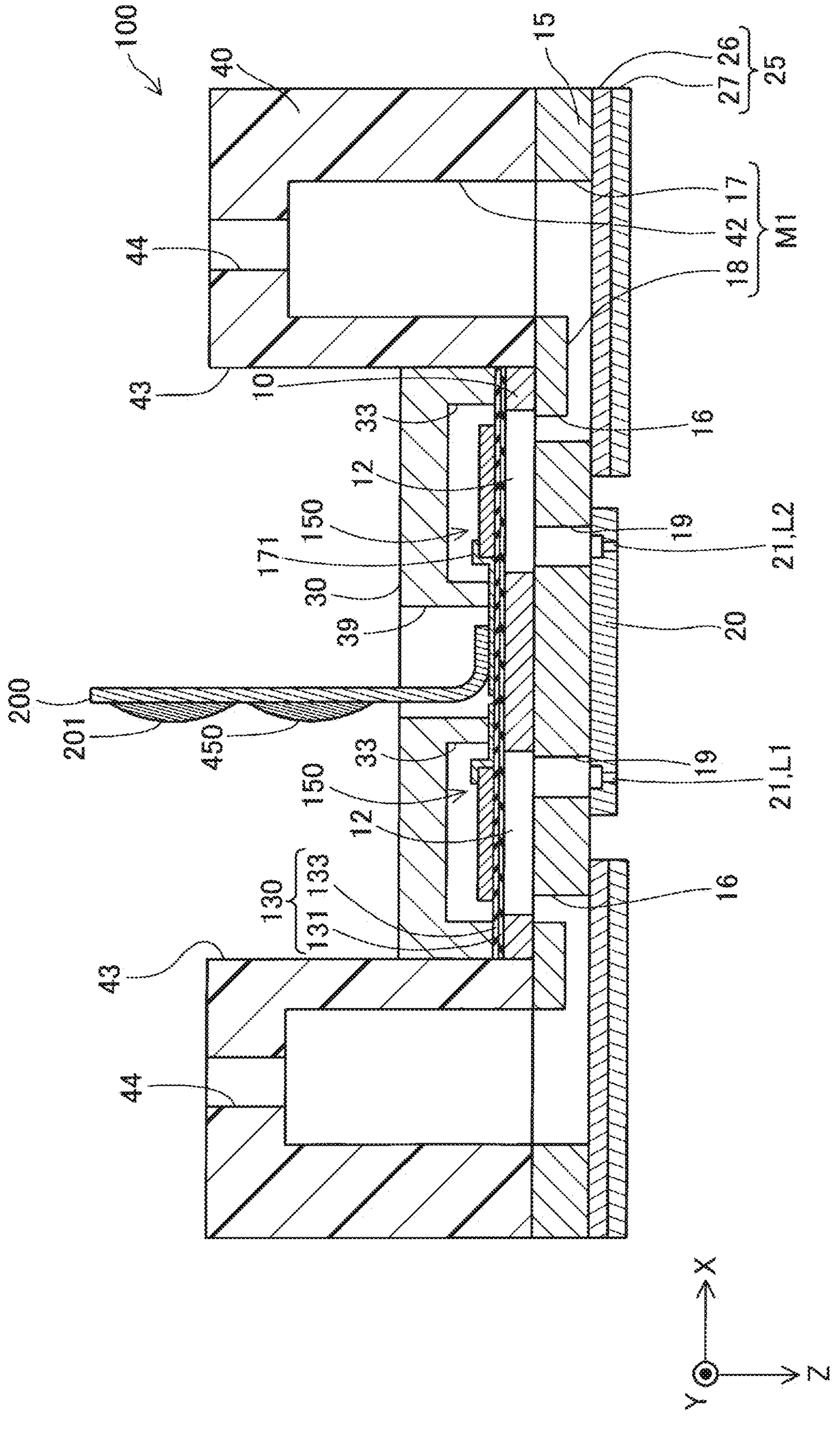
FIG. 5 is a cross-sectional view illustrating a cross-section of the liquid ejecting head taken along the V-V line in FIG. 4.

The detailed configuration of the liquid ejecting head 100 will be described with reference to FIGS. 3 to 5. FIG. 3 is an exploded perspective view illustrating the configuration of the liquid ejecting head 100. FIG. 4 is an explanatory diagram illustrating the configuration of the liquid ejecting head 100 in plan view. In the present specification, the "plan view" means a state of viewing an object in a direction of lamination. FIG. 5 is a cross-sectional view illustrating a cross-section of the liquid ejecting head 100 taken along the V-V line in FIG. 4.

As illustrated in FIG. 3, the liquid ejecting head 100 includes a pressure chamber substrate 10, a communication substrate 15, a nozzle substrate 20, a compliance substrate 25, a protection substrate 30, a case member 40, a vibration plate 130, piezoelectric elements 150, individual electrodes 171, a common electrode 172, wires 175, a wiring board 200, the temperature detection unit 410, and the temperature detection circuit 450. Note that FIG. 3 omits illustration of the vibration plate 130 (see FIG. 5), the piezoelectric elements 150 (see FIG. 5), the temperature detection unit 410 (see FIG. 4), and the temperature detection circuit 450 (see FIG. 5).

The pressure chamber substrate 10, the communication substrate 15, the nozzle substrate 20, the compliance substrate 25, the protection substrate 30, the case member 40, the vibration plate 130, and the piezoelectric elements 150 are lamination members. The liquid ejecting head 100 is formed by laminating these lamination members. A direction to laminate the lamination members constituting the liquid ejecting head 100 will also be referred to as a "direction of lamination". In the present embodiment, the direction of lamination coincides with the z-axis direction. With respect to a predetermined reference position, +z direction side will also be referred to as a "lower side" while −z direction side will also be referred to as an "upper side".

The pressure chamber substrate 10 is formed from a single-crystal silicon substrate. Alternatively, the pressure chamber substrate 10 may be formed from a metal material such as stainless steel (SUS) and a nickel (Ni), a ceramic material such as zirconia ($ZrO_2$) and alumina ($Al_2O_3$), a glass ceramic material, or an oxide material such as magnesium oxide (MgO) and lanthanum aluminate ($LaAlO_3$).

As illustrated in FIG. 4, the pressure chamber substrate 10 is provided with pressure chambers 12. Each pressure chamber 12 is a space for applying a pressure to the liquid. In the example illustrated in FIG. 4, the pressure chamber substrate 10 is provided with a first pressure chamber line L1 including pressure chambers 12 arranged in the y-axis direction, and a second pressure chamber line L2 including pressure chambers 12 arranged in the y-axis direction. A direction (the y-axis direction) of arrangement of the pressure chambers 12 will be referred to as a direction of arrangement. The first pressure chamber line L1 and the second pressure chamber line L2 are disposed in such a way as to be arranged in a direction (the x-axis direction) intersecting with the direction of arrangement. The pressure chambers 12 that belong to the first pressure chamber line L1 and the pressure chambers 12 that belong to the second pressure chamber line L2 are disposed in such a way as to be located in a staggered fashion in the direction of arrangement (the y-axis direction). The direction of arrangement of the pressure chambers 12 will also be referred to as a "first direction". The direction intersecting with the direction of arrangement will also be referred to as a "second direction".

As illustrated in FIG. 3, the communication substrate 15 is disposed on a lower side of the pressure chamber substrate 10. The communication substrate 15 is fixed to a surface on the lower side of the pressure chamber substrate 10 by using an adhesive. The communication substrate 15 is formed from a single-crystal silicon substrate, for example.

As illustrated in FIG. 5, the communication substrate 15 is provided with ink supply channels 16, first common liquid chambers 17, second common liquid chambers 18, and nozzle communication ports 19. Each ink supply channel 16 is a through hole that penetrates the communication substrate 15 in the z-axis direction. The ink supply channel 16 is formed in the pressure chamber substrate 10 and couples the pressure chamber 12 to the second common liquid chamber 18. The ink supply channel 16 is a flow channel that introduces the liquid into the pressure chamber 12. Each first common liquid chamber 17 is formed as a through hole that penetrates the communication substrate 15 in the z-axis direction. Each second common liquid chamber 18 is formed as a recess provided on a lower surface (a surface on the −z side) of the communication substrate 15. The second common liquid chamber 18 couples the ink supply channel 16 to the first common liquid chamber 17. The first common liquid chamber 17 and the second common liquid chamber 18 form a manifold M1 constituting a common liquid chamber in conjunction with a liquid chamber unit 42 provided to the case member 40 to be described later. Each nozzle communication port 19 is a through hole that penetrates the communication substrate 15 in the z-axis direction. The nozzle communication port 19 couples the pressure chamber 12 to the nozzle 21. The nozzle communication port 19 is a flow channel that discharges the liquid from the pressure chamber 12. The communication substrate 15 is provided with the nozzle communication ports 19 in the number corresponding to the number of the nozzles 21.

As illustrated in FIG. 3, the nozzle substrate 20 and the compliance substrate 25 are disposed on the lower side of the communication substrate 15. The nozzle substrate 20 and the compliance substrate 25 are fixed to a surface on the lower side of the communication substrate 15 by using an adhesive. The nozzle substrate 20 is formed from a single-crystal silicon substrate, for example. The nozzle substrate 20 is provided with the nozzles 21.

The compliance substrate 25 is disposed around the nozzle substrate 20. As illustrated in FIG. 5, the compliance substrate 25 covers respective openings of the first common liquid chambers 17 and the second common liquid chambers 18 provided to the communication substrate 15. The compliance substrate 25 includes a sealing film 26 formed from a flexible thin film, and a fixation substrate 27 formed from a hard material such as a metal.

As illustrated in FIG. 5, the protection substrate 30 is disposed on an upper side of the pressure chamber substrate 10 while interposing the vibration plate 130 therebetween. The protection substrate 30 is fixed to a surface on the upper side of the vibration plate 130 by using an adhesive. The vibration plate 130 disposed between the pressure chamber substrate 10 and the protection substrate 30 will be described later. A material constituting the protection substrate 30 is the same as that of the pressure chamber substrate 10.

The protection substrate 30 is provided in order to protect the piezoelectric element 150 and to increase strength of the pressure chamber substrate 10 and the vibration plate 130. The protection substrate 30 is provided with recesses 33 and a through hole 39. Each recess 33 is a recess that is open on the +z side. The recess 33 is not coupled to the flow channel for the liquid. For this reason, the liquid does not circulate in the recesses 33. The through hole 39 is a through hole that penetrates the protection substrate 30 in the z-axis direction. The wiring board 200 is inserted into the through hole 39.

As illustrated in FIG. 3, the case member 40 is disposed on the upper side of the communication substrate 15. The case member 40 is formed from a resin material, for example.

As illustrated in FIG. 5, the case member 40 includes the liquid chamber unit 42, a coupling port 43, and two liquid communication ports 44. As described earlier, the liquid chamber unit 42 forms the manifold M1 constituting the common liquid chamber in conjunction with the first common liquid chamber 17 and the second common liquid chamber 18 provided to the communication substrate 15. The coupling port 43 is a through hole that penetrates the case member 40 in the z-axis direction. The protection substrate 30 is fitted into the coupling port 43. Each liquid communication port 44 is a through hole that penetrates the case member 40 in the z-axis direction. The liquid flows from the liquid communication port 44 into the liquid ejecting head 100.

The vibration plate 130 is laminated on the upper side of the pressure chamber substrate 10 at a position overlapping the pressure chambers 12 when viewed in the direction of lamination. The vibration plate 130 includes a flexible layer 131 and a protection layer 133. The flexible layer 131 is formed on the pressure chamber substrate 10. The flexible layer 131 is formed from silicon dioxide ($SiO_2$), for example. The protection layer 133 is formed on the flexible layer 131. The protection layer 133 is an insulating film formed from zirconium oxide ($ZrO_2$), for example.

The piezoelectric elements 150 are disposed on the upper side of the pressure chamber substrate 10 together with the vibration plate 130. To be more precise, each piezoelectric element 150 is disposed above the vibration plate 130 inside the recess 33 provided to the protection substrate 30. The piezoelectric element 150 vibrates the vibration plate 130, thereby applying the pressure to the liquid in the pressure chamber 12. When the pressure is applied to the liquid in the pressure chamber 12, the liquid is ejected from the nozzle 21 through the nozzle communication port 19.

Figure 6:
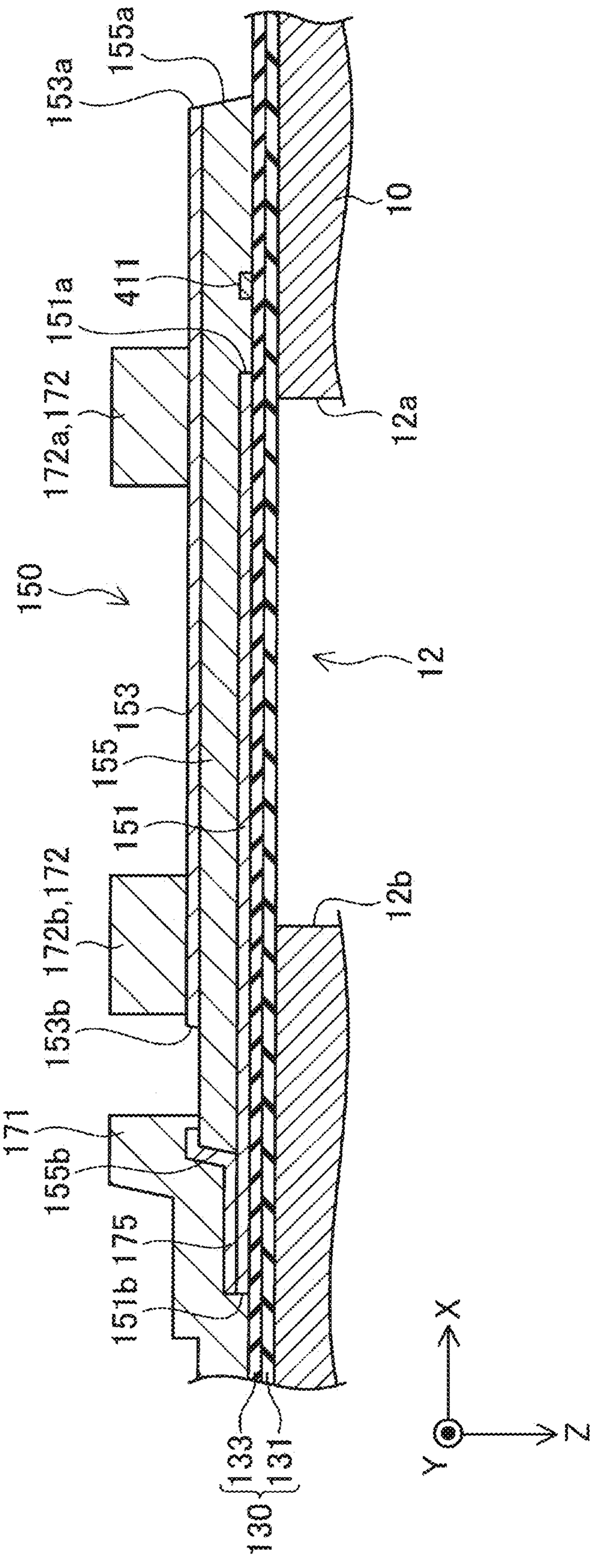
FIG. 6 is an enlarged cross-sectional view of a portion in the vicinity of a piezoelectric element in a first pressure chamber line.

FIG. 6 is an enlarged cross-sectional view of a portion in the vicinity of one of the piezoelectric elements 150 in the first pressure chamber line L1. While the piezoelectric element 150 in the first pressure chamber line L1 will be described below as an example, it is to be noted that the second pressure chamber line L2 has the same configuration. The piezoelectric element 150 includes a first electrode 151, a second electrode 153, and a piezoelectric body 155. The first electrode 151, the piezoelectric body 155, and the second electrode 153 are laminated in this order in the direction of lamination.

The first electrode 151 is an individual electrode to be individually provided to each of the pressure chambers 12. The first electrode 151 is formed from a conductive material such as gold (Au), platinum (Pt), iridium (Ir), titanium (Ti), and tungsten (W). The first electrode 151 is disposed at such a position that overlaps the corresponding pressure chamber 12 on the surface on the upper side of the vibration plate 130 when viewed in the direction of lamination. As illustrated in FIG. 4, a width of the first electrode 151 is smaller than a width in a lateral direction (the y-axis direction) of the pressure chamber 12.

As illustrated in FIG. 6, an end portion 151*a* on the +x side of the first electrode 151 is located on an outer side (the +x side) relative to an end portion 12*a* on the +x side of the pressure chamber 12. An end portion 151*b* on the −x side of the first electrode 151 is located on an outer side (the −x side) relative to an end portion 12*b* on the −x side of the pressure chamber 12. In other words, a length of the first electrode 151 is larger than a length in a longitudinal direction (the x direction) of the pressure chamber 12.

The piezoelectric body 155 is disposed in such a way as to extend in the direction of arrangement (the y-axis direction) of the pressure chambers 12. The piezoelectric body 155 is formed from a lead zirconate titanate (PZT), for example. Instead, the piezoelectric body 155 may be formed from a different material such as potassium sodium diniobate and barium titanate. The piezoelectric body 155 is formed in a thickness in a range from 1000 nm to 4000 nm, for example.

As illustrated in FIG. 6, an end portion 155*a* on the +x side of the piezoelectric body 155 is located on an outer side (the +x side) relative to the end portion 12*a* on the +x side of the pressure chamber 12. An end portion 155*b* on the −x side of the piezoelectric body 155 is located on an outer side (the −x side) relative to the end portion 12*b* on the −x side of the pressure chamber 12. In other words, a length of the piezoelectric body 155 is larger than the length in the longitudinal direction (the x direction) of the pressure chamber 12. Since the piezoelectric body 155 extends to the outside of the pressure chamber 12 in the longitudinal direction as described above, the strength of the vibration plate 130 is improved.

Figure 7:
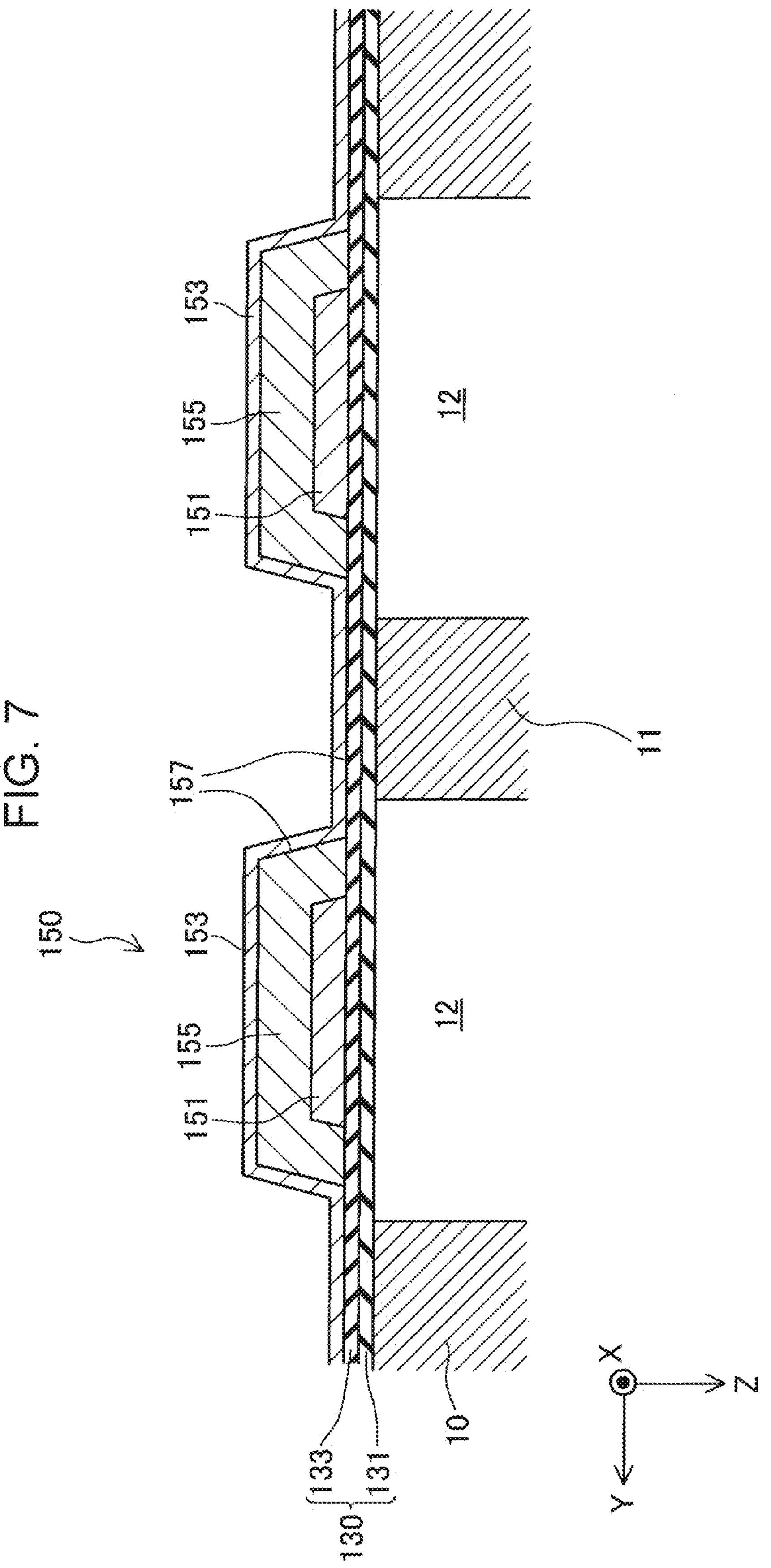
FIG. 7 is a cross-sectional view illustrating a cross-section of the liquid ejecting head taken along the VII-VII line in FIG. 4.

FIG. 7 is a cross-sectional view taken along the VII-VII line in FIG. 4. A groove portion 157 is formed between two adjacent piezoelectric bodies 155. As illustrated in FIG. 4, the groove portion 157 takes on a rectangular shape when viewed in the direction of lamination. As illustrated in FIG. 7, the groove portion 157 is provided at a position corresponding to each partition wall 11. The partition wall 11 is a wall portion that separates two adjacent pressure chambers 12. A width of the groove portion 157 in the y-axis direction is set equal to or above a width of the partition wall 11. The groove portion 157 is formed by providing a layer of the piezoelectric body 155 on the vibration plate 130 and the first electrode 151, and then removing the piezoelectric body 155 in an appropriate region.

Each second electrode 153 is a common electrode to be provided to the pressure chambers 12 in common. As illustrated in FIG. 4, the second electrode 153 is disposed in such a way as to extend in the direction of arrangement (the y-axis direction) of the pressure chambers 12. The second electrode 153 is disposed across a range overlapping all the pressure chambers 12 that belong to the pressure chamber line for each of the first pressure chamber line L1 and the second pressure chamber line L2. The second electrode 153 may be formed from the same material as that of the first electrode 151 or may be formed from a different material therefrom. As illustrated in FIG. 7, the second electrode 153 is also provided on a side surface of the groove portion 157 of the piezoelectric body 155 and on the protection layer 133 being a bottom surface of the groove portion 157. The second electrode 153 in the first pressure chamber line L1 will also be referred to as a "first common electrode". The second electrode 153 in the second pressure chamber line L2 will also be referred to as a "second common electrode". In the present embodiment, the second electrode 153 is provided to each of the first pressure chamber line L1 and the second pressure chamber line L2. Thus, it is possible to prevent consumption of unnecessary electric power when driving only one of the first pressure chamber line L1 and the second pressure chamber line L2.

The first electrodes 151 and the second electrodes 153 are electrically coupled to a driving circuit 201 provided to the wiring board 200 (see FIG. 5). The drive signal is applied to each first electrode 151. The drive signal varies depending on an amount of ejection of the liquid. In the present embodiment, a waveform of the drive signal varies depending on the temperature of the liquid in the pressure chamber 12. A reference voltage signal is applied to each second electrode 153. The reference voltage signal is constant irrespective of the amount of ejection of the liquid. The amount of ejection of the liquid is an amount of change in volume required by the pressure chamber 12. The piezoelectric body 155 is deformed when a difference in potential is generated between the first electrode 151 and the second electrode 153. Due to the deformation of the piezoelectric body 155, the vibration plate 130 is vibrated so as to change the volume of the pressure chamber 12. The pressure is applied to the liquid contained in the pressure chamber 12 as a consequence of the change in volume of the pressure chamber 12, and the liquid is ejected from the nozzle 21 through the nozzle communication port 19.

As illustrated in FIGS. 4 and 6, the individual electrodes 171 and the common electrode 172 to be described later function as drive wiring for applying a voltage for driving the piezoelectric bodies 155 to the piezoelectric bodies 155. Each individual electrode 171 couples the first electrode 151 to the wiring board 200. The wire 175 couples the individual electrode 171 to the first electrode 151 in the vicinity of the end portion 151*b* on the −x side of the first electrode 151. Accordingly, the first electrode 151 being the individual electrode is electrically coupled to the wiring board 200.

As illustrated in FIG. 4, in each of the first pressure chamber line L1 and the second pressure chamber line L2, the common electrode 172 couples the second electrode 153 being the corresponding common electrode to the wiring board 200. The common electrode 172 includes an extending portion 172*a*, an extending portion 172*b*, a coupling portion 172*c*, and a coupling portion 172*d*.

As illustrated in FIGS. 4 and 6, the extending portion 172*a* extends in the lateral direction (the y-axis direction) of the pressure chamber 12 at the position corresponding to the end portion 12*a* on the +x side of the pressure chamber 12. The extending portion 172*b* extends in the lateral direction (the y-axis direction) of the pressure chamber 12 at the position corresponding to the end portion 12*b* on the −x side of the pressure chamber 12.

The coupling portion 172*c* is a portion disposed in the vicinity of an end portion on the −y side of the extending portion 172*b* and extends from the extending portion 172*b* toward the wiring board 200. The coupling portion 172*c* extends in a direction having a predetermined inclination with respect to the x axis. For example, the coupling portion 172*c* extends in an axial direction in a case of turning the x axis clockwise at 20 degrees within the xy plane. An end portion of the coupling portion 172*c* is coupled to the wiring board 200. Accordingly, an end portion of the second electrode 153 being the common electrode is electrically coupled to the wiring board 200.

The coupling portion 172*d* is a portion disposed in the vicinity of an end portion on the +y side of the extending portion 172*b* and extends from the extending portion 172*b* toward the wiring board 200. The coupling portion 172*d* extends in the same direction as the coupling portion 172*c*. An end portion of the coupling portion 172*d* is coupled to the wiring board 200. Accordingly, another end portion of the second electrode 153 being the common electrode is electrically coupled to the wiring board 200.

As illustrated in FIG. 5, the individual electrodes 171 and the common electrode 172 are disposed in such a way as to be partially exposed to the inside of the through hole 39 formed in the protection substrate 30. The individual electrodes 171 and the common electrode 172 are electrically coupled to the wiring board 200 in the through hole 39.

The individual electrodes 171 and the common electrode 172 are formed from a conductive material such as gold (Au), copper (Cu), titanium (Ti), tungsten (W), nickel (Ni), chromium (Cr), platinum (Pt), and aluminum (Al). The individual electrodes 171 and the common electrode 172 are formed on the same layer. However, the individual electrodes 171 are not electrically coupled to the common electrode 172. Thus, it is possible to simplify a manufacturing process and to reduce costs as compared to a case of forming the individual electrodes 171 and the common electrode 172 on different layers.

The coupling portion 172*c* of the common electrode 172 in the first pressure chamber line L1 will also be referred to as a "third coupling terminal". The coupling portion 172*c* of the common electrode 172 in the second pressure chamber line L2 will also be referred to as a "fourth coupling terminal". The coupling portion 172*d* of the common electrode 172 in the first pressure chamber line L1 will also be referred to as a "fifth coupling terminal". The coupling portion 172*d* of the common electrode 172 in the second pressure chamber line L2 will also be referred to as a "sixth coupling terminal". The individual electrode 171 in the first pressure chamber line L1 will also be referred to as a "seventh coupling terminal". The individual electrode 171 in the second pressure chamber line L2 will also be referred to as an "eighth coupling terminal".

The wiring board 200 is formed from a flexible printed circuit (FPC) board, for example.

As illustrated in FIG. 5, the wiring board 200 is provided with the driving circuit 201 and the temperature detection circuit 450 to be described later. The driving circuit 201 generates the drive signal for driving the piezoelectric elements 150 based on a control signal supplied from the head control unit 520 of the control unit 500.

As illustrated in FIG. 4, the temperature detection unit 410 includes a first detection resistor 411, a second detection resistor 412, a first detection lead electrode 415, and a second detection lead electrode 416. The resistance measurement unit 452 acquires a resistance value of combined resistance of these components.

As illustrated in FIG. 4, the first detection resistor 411 is disposed in such a way as to surround the first pressure chamber line L1 except a side of the first pressure chamber line L1 being adjacent to the second pressure chamber line L2. The first detection resistor 411 is disposed at such a position that a resistance value varies depending on the temperature of the liquid inside the pressure chamber 12 of the first pressure chamber line L1. The second detection resistor 412 is disposed in such a way as to surround the second pressure chamber line L2 except a side of the second pressure chamber line L2 being adjacent to the first pressure chamber line L1. The second detection resistor 412 is disposed at such a position that a resistance value varies depending on the temperature of the liquid inside the pressure chamber 12 of the second pressure chamber line L2.

As illustrated in FIG. 6, the first detection resistor 411 is provided on a surface on the −z side of the vibration plate 130. To be more precise, the first detection resistor 411 is disposed between the vibration plate 130 and the piezoelectric body 155 in the direction of lamination (the z-axis direction) and is covered with the piezoelectric body 155. The same applies to the second detection resistor 412.

The first detection resistor 411 and the second detection resistor 412 are disposed on the same layer as the first electrode 151 in the direction of lamination. The first detection resistor 411 and the second detection resistor 412 are formed from the same material as that of the first electrode 151. As with the first electrode 151, the first detection resistor 411 and the second detection resistor 412 are formed from a material such as gold (Au), platinum (Pt), iridium (Ir), titanium (Ti), and tungsten (W). Each of these materials is a material having conductivity with its electric resistance value exhibiting a temperature dependency at the same time.

The first detection resistor 411 and the second detection resistor 412 are formed together with the first electrode 151 in a process of forming the first electrode 151. However, the first detection resistor 411 and the second detection resistor 412 are not electrically coupled to the first electrode 151.

Thus, it is possible to simplify a manufacturing process and to reduce costs as compared to a case of forming the first detection resistor 411 and the second detection resistor 412 on a different layer from the first electrode 151.

As illustrated in FIG. 4, the first detection lead electrode 415 couples an end portion on the −y side of the first detection resistor 411 and an end portion on the −y side of the second detection resistor 412 in a lump to the wiring board 200 in the vicinity of end portions on the −y side of the first pressure chamber line L1 and the second pressure chamber line L2. The second detection lead electrode 416 couples an end portion on the +y side of the first detection resistor 411 and an end portion on the +y side of the second detection resistor 412 in a lump to the wiring board 200 in the vicinity of end portions on the +y side of the first pressure chamber line L1 and the second pressure chamber line L2. The first detection lead electrode 415 will also be referred to as a "first coupling terminal". The second detection lead electrode 416 will also be referred to as a "second coupling terminal".

The first detection lead electrode 415 and the second detection lead electrode 416 are disposed on the same layer as the individual electrodes 171 and the common electrode 172 in the direction of lamination. The first detection lead electrode 415 and the second detection lead electrode 416 are formed from the same material as that of the individual electrodes 171 and the common electrode 172. The first detection lead electrode 415 and the second detection lead electrode 416 are formed together with the individual electrodes 171 and the common electrode 172 in a process of forming the individual electrodes 171 and the common electrode 172. However, the first detection lead electrode 415 and the second detection lead electrode 416 are not electrically coupled to the individual electrodes 171 and the common electrode 172. By adopting the above-described configuration, it is possible to simplify a manufacturing process and to reduce costs as compared to a case of forming the first detection lead electrode 415 and the second detection lead electrode 416 on a different layer from the individual electrodes 171 and the common electrode 172.

As with the individual electrodes 171 and the common electrode 172 being partially disposed on the piezoelectric body 155 (see FIG. 6), the first detection lead electrode 415 and the second detection lead electrode 416 are partially disposed on the piezoelectric body 155.

As illustrated in FIG. 4, one end of the first detection resistor 411 and one end of the second detection resistor 412 are coupled to the wiring board 200 in common, while another end of the first detection resistor 411 and another end of the second detection resistor 412 are coupled to the wiring board 200 in common. That is to say, the first detection resistor 411 and the second detection resistor 412 are coupled to the wiring board 200 in parallel.

In the present embodiment, the first detection resistor 411 and the second detection resistor 412 are coupled in parallel in order to reduce combined resistance of the first detection resistor 411 and the second detection resistor 412. For example, a resistance value of the first detection resistor 411 will be defined as R1 and a resistance value of the second detection resistor 412 will be defined as R2. Combined resistance Rtp when coupling the first detection resistor 411 and the second detection resistor 412 in parallel is equal to $R1 \cdot R2/(R1+R2)$. Here, resistance values of the first detection lead electrode 415 and the second detection lead electrode 416 are not taken into consideration in order to facilitate technical understanding.

An assumption is made to couple the first detection resistor 411 and the second detection resistor 412 in series. Here, the serial coupling is equivalent to coupling the one end of the first detection resistor 411 and the one end of the second detection resistor 412 individually to the wiring board 200 and coupling the other end of the first detection resistor 411 and the other end of the second detection resistor 412 to each other. The other end of the first detection resistor 411 and the other end of the second detection resistor 412 are not coupled to the wiring board 200. In this case, combined resistance Rts of the first detection resistor 411 and the second detection resistor 412 is equal to R1+R2.

As described above, the combined resistance Rtp when the first detection resistor 411 and the second detection resistor 412 are coupled in parallel is lower than the combined resistance Rts when the first detection resistor 411 and the second detection resistor 412 are not coupled in parallel.

A reason why it is desirable to reduce the combined resistance of the first detection resistor 411 and the second detection resistor 412 is as follows. The first detection resistor 411 and the second detection resistor 412 are disposed in the vicinity of the pressure chamber 12 in order to detect the temperature of the ink in the pressure chamber 12. Accordingly, the first detection resistor 411 and the second detection resistor 412 are influenced by noise attributed to currents that flow on the individual electrodes 171 and the common electrode 172 being the drive wiring of the piezoelectric elements 150. While a larger current may be fed to the detection resistor in order to relatively reduce the influence of the noise, this method is not desirable in light of a possibility of causing a state of overvoltage. Accordingly, in the present embodiment, the combined resistance of the first detection resistor 411 and the second detection resistor 412 is reduced so that the value of the current flowing on the first detection resistor 411 and the second detection resistor 412 can be increased as compared to that in the aspect of coupling the first detection resistor 411 and the second detection resistor 412 in series. In this way, the influence of the noise attributed to the drive current on the piezoelectric element 150 is reduced.

Meanwhile, as illustrated in FIG. 4, a width in the direction of arrangement (the y-axis direction) of the first detection lead electrode 415 is larger than a width of each individual electrode 171 in the present embodiment. By increasing the width of the first detection lead electrode 415, it is possible to widen a cross-sectional area of the first detection lead electrode 415. By widening the cross-sectional area of the first detection lead electrode 415, the resistance value of the first detection lead electrode 415 can be reduced as compared to the aspect of setting the width of the first detection lead electrode 415 equal to the width of the individual electrode 171. By reducing the resistance value of the first detection lead electrode 415, it is possible to reduce the combined resistance of the temperature detection unit 410. As a consequence, the value of the current flowing on the temperature detection unit 410 can be increased. This reduces the influence of the noise attributed to the drive current on the piezoelectric element 150.

In the meantime, in the present embodiment, a distance in the direction of arrangement (the y-axis direction) between the first detection lead electrode 415 and the coupling portion 172*c* in the first pressure chamber line L1 is set shorter than a distance in the direction of arrangement between the first detection lead electrode 415 and the coupling portion 172*c* in the second pressure chamber line L2. A distance in the direction of arrangement between the second detection lead electrode 416 and the coupling portion 172*d* in the first pressure chamber line L1 is set longer than a distance in the direction of arrangement between the second detection lead electrode 416 and the coupling portion 172*d* in the second pressure chamber line L2. On the one end portion side (the −y side) in the direction of arrangement of the first pressure chamber line L1, the distance between the first detection lead electrode 415 and the coupling portion 172*c* of the common electrode 172 in the first pressure chamber line L1 is short. Accordingly, on the other end portion side (the +y side) in the direction of arrangement of the first pressure chamber line L1, the distance between the second detection lead electrode 416 and the coupling portion 172*d* is set long. Adoption of the above-described configuration reduces a difference between a magnitude of electromagnetic induction noise on the first detection lead electrode 415 attributed to the common electrode 172 and a magnitude of electromagnetic induction noise on the second detection lead electrode 416 attributed to the common electrode 172. That is to say, it is possible to maintain balance between the influence of the noise on the first detection lead electrode 415 and the influence of the noise on the second detection lead electrode 416.

Meanwhile, a length in a direction (a direction of extension) in which the first detection lead electrode 415 extends is larger than a length in the direction of extension of the coupling portion 172*c* in the first pressure chamber line L1 and larger than a length in the direction of extension of the coupling portion 172*c* in the second pressure chamber line L2. Here, in the example illustrated in FIG. 4, the direction of extension (the x-axis direction) of the first detection lead electrode 415 does not precisely coincide with the directions of extension of the coupling portion 172*c* in the first pressure chamber line L1 and the coupling portion 172*c* in the second pressure chamber line L2. Alignment with the x-axis direction is assumed to encompass a range inclined by +30° with respect to the x-axis direction, and the directions of extension of the coupling portion 172*c* in the first pressure chamber line L1 and the coupling portion 172*c* in the second pressure chamber line L2 are assumed to be aligned with the x-axis direction.

The length in the direction of extension of the coupling portion 172*c* in the first pressure chamber line L1 and the length in the direction of extension of the coupling portion 172*c* in the second pressure chamber line L2 are not set to unnecessarily large lengths. Thus, the influence of induction noise on the first detection lead electrode 415 is reduced.

B. Other Embodiments

B1. Other Embodiment 1

The Embodiment has explained the example in which the temperature management unit 550 acquires the temperature of the ink in the pressure chamber 12 by using the resistance value of the detection resistor of the temperature detection unit 410 acquired from the resistance measurement unit 452 and using the conversion table TB stored in the memory 502 in advance.

There is also a case of driving only one of the first pressure chamber line L1 and the second pressure chamber line L2 in the liquid ejecting head 100. In this regard, the memory 502 may store a first conversion table TB1 and a second conversion table TB2 in advance instead of the conversion table TB. The first conversion table TB1 includes information that represents correspondence between the resistance value of the detection resistor of the temperature detection unit 410 and the temperature when driving the first pressure chamber line L1 and the second pressure chamber line L2. The second conversion table TB2 includes information that represents correspondence between the resistance value of the detection resistor of the temperature detection unit 410 and the temperature when driving one of the first pressure chamber line L1 and the second pressure chamber line L2.

When driving the first pressure chamber line L1 and the second pressure chamber line L2, the temperature management unit 550 can acquire the temperature of the ink in the pressure chamber 12 by using the resistance value of the detection resistor of the temperature detection unit 410 acquired from the resistance measurement unit 452 and using the first conversion table TB1. When driving one of the first pressure chamber line L1 and the second pressure chamber line L2, the temperature management unit 550 can acquire the temperature of the ink in the pressure chamber 12 by using the resistance value of the detection resistor of the temperature detection unit 410 acquired from the resistance measurement unit 452 and using the second conversion table TB2. The temperature management unit 550 will also be referred to as a correspondence relation acquisition unit. The first conversion table TB1 will also be referred to as a first correspondence relation. The second conversion table TB2 will also be referred to as a second correspondence relation.

Even when driving one of the first pressure chamber line L1 and the second pressure chamber line L2, the resistance measurement unit 452 acquires the combined resistance of the temperature detection unit 410 including the first detection resistor 411 and the second detection resistor 412. Accordingly, it is possible to improve temperature detection accuracy by using any of the first conversion table TB1 and the second conversion table TB2 prepared in advance.

B2. Other Embodiment 2

The Other Embodiment 1 has described the example of using the first conversion table TB1 being an example of the first correspondence relation and the second conversion table TB2 being an example of the second correspondence relation in order to acquire the temperature of the ink in the pressure chamber 12. Nonetheless, a first computation formula F1 and a second computation formula F2 may be used in order to acquire the temperature of the ink in the pressure chamber 12. The first computation formula F1 is a computation formula for computing the temperature of the ink based on the resistance value of the detection resistor of the temperature detection unit 410 in the case of driving the first pressure chamber line L1 and the second pressure chamber line L2. The second computation formula F2 is a computation formula for computing the temperature of the ink based on the resistance value of the detection resistor of the temperature detection unit 410 in the case of driving one of the first pressure chamber line L1 and the second pressure chamber line L2. The first computation formula F1 and the second computation formula F2 are stored in the memory 502 in advance. The first computation formula F1 will also be referred to as the "first correspondence relation". The second computation formula F2 will also be referred to as the "second correspondence relation".

When driving the first pressure chamber line L1 and the second pressure chamber line L2, the temperature management unit 550 can acquire the temperature of the ink in the pressure chamber 12 by using the resistance value of the detection resistor of the temperature detection unit 410 acquired from the resistance measurement unit 452 and using the first computation formula F1. When driving one of the first pressure chamber line L1 and the second pressure chamber line L2, the temperature management unit 550 can acquire the temperature of the ink in the pressure chamber 12 by using the resistance value of the detection resistor of the temperature detection unit 410 acquired from the resistance measurement unit 452 and using the second computation formula F2. It is possible to improve temperature detection accuracy by using any of the first computation formula F1 and the second computation formula F2 prepared in advance.

B3. Other Embodiment 3

Figure 8:
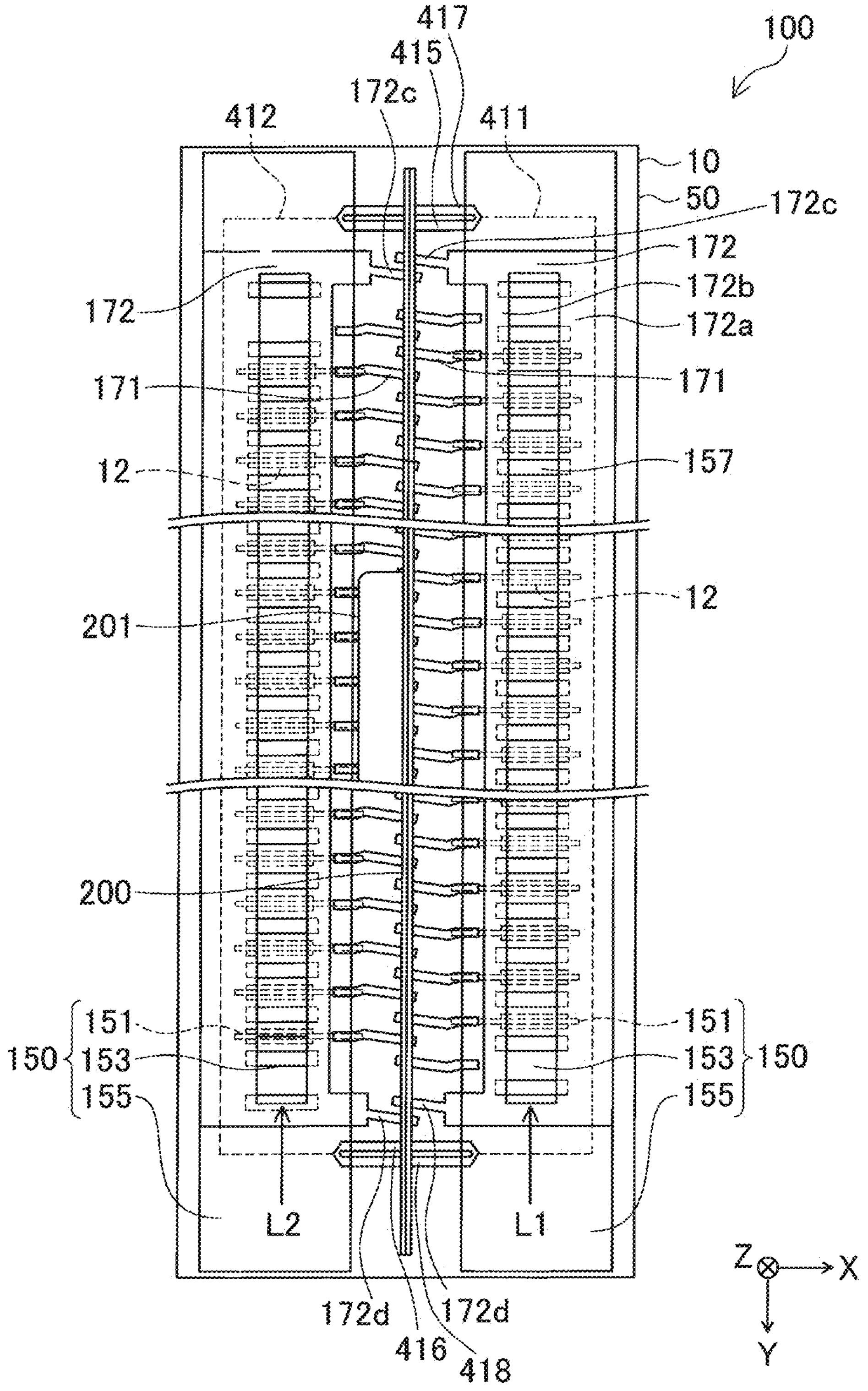
FIG. 8 is an explanatory diagram illustrating a configuration of a liquid ejecting head according to Other Embodiment 3 in plan view.

FIG. 8 is an explanatory diagram illustrating a configuration of the liquid ejecting head 100 according to the Other Embodiment 3 in plan view. In the Other Embodiment 3, the first detection lead electrode 415 and a third detection lead electrode 417, which are coupled in parallel, couple the end portion on the −y side of the first detection resistor 411 and the end portion on the −y side of the second detection resistor 412 in a lump to the wiring board 200 in the vicinity of the end portions on the −y side of the first pressure chamber line L1 and the second pressure chamber line L2.

Meanwhile, the second detection lead electrode 416 and a fourth detection lead electrode 418, which are coupled in parallel, couple the end portion on the +y side of the first detection resistor 411 and the end portion on the +y side of the second detection resistor 412 in a lump to the wiring board 200 in the vicinity of the end portions on the +y side of the first pressure chamber line L1 and the second pressure chamber line L2. The third detection lead electrode 417 will also be referred to as a "first parallel coupling terminal". The fourth detection lead electrode 418 will also be referred to as a "second parallel coupling terminal".

Combined resistance of the first detection lead electrode 415 and the third detection lead electrode 417 coupled in parallel is lower than the resistance when using the first detection lead electrode 415 alone (see FIG. 4). Combined resistance of the second detection lead electrode 416 and the fourth detection lead electrode 418 coupled in parallel is lower than the resistance when using the second detection lead electrode 416 alone (see FIG. 4). Accordingly, it is possible to reduce the combined resistance of the temperature detection unit 410. As a consequence, it is possible to increase the value of the current flowing on the temperature detection unit 410. Thus, the influence of the noise attributed to the drive current on the piezoelectric element 150 is reduced.

B4. Other Embodiment 4

Meanwhile, widths of the first detection resistor 411 and the second detection resistor 412 in the longitudinal direction (the x-axis direction) of the pressure chamber 12 may be set larger than those in the example illustrated in FIGS. 4 and 6. By widening the cross-sectional areas of the first detection resistor 411 and the second detection resistor 412, the respective resistance values of the first detection resistor 411 and the second detection resistor 412 can be reduced. As a consequence, it is possible to increase the values of the currents flowing on the first detection resistor 411 and the second detection resistor 412. In this way, the influence of the noise attributed to the drive current of the piezoelectric element 150 is reduced.

B5. Other Embodiment 5

Meanwhile, a single common electrode (a third common electrode) corresponding to both the first pressure chamber line L1 and the second pressure chamber line L2 may be provided instead of individually providing the second electrodes 153 to the first pressure chamber line L1 and the second pressure chamber line L2. In other words, the two second electrodes 153 in FIG. 4 may be configured to be joined to each other. In this case, a coupling portion between the wiring board and the common electrode corresponding to both the first pressure chamber line L1 and the second pressure chamber line L2 will also be referred to as a "ninth coupling terminal".

B6. Other Embodiment 6

The Embodiment has described the example in which the individual electrodes 171, the coupling portions 172*c*, and the coupling portions 172*d* extend in the same direction (see FIG. 4). Instead, a layout of the individual electrodes 171, the coupling portions 172*c*, and the coupling portions 172*d* may be different from that illustrated in FIG. 4.

Figure 9:
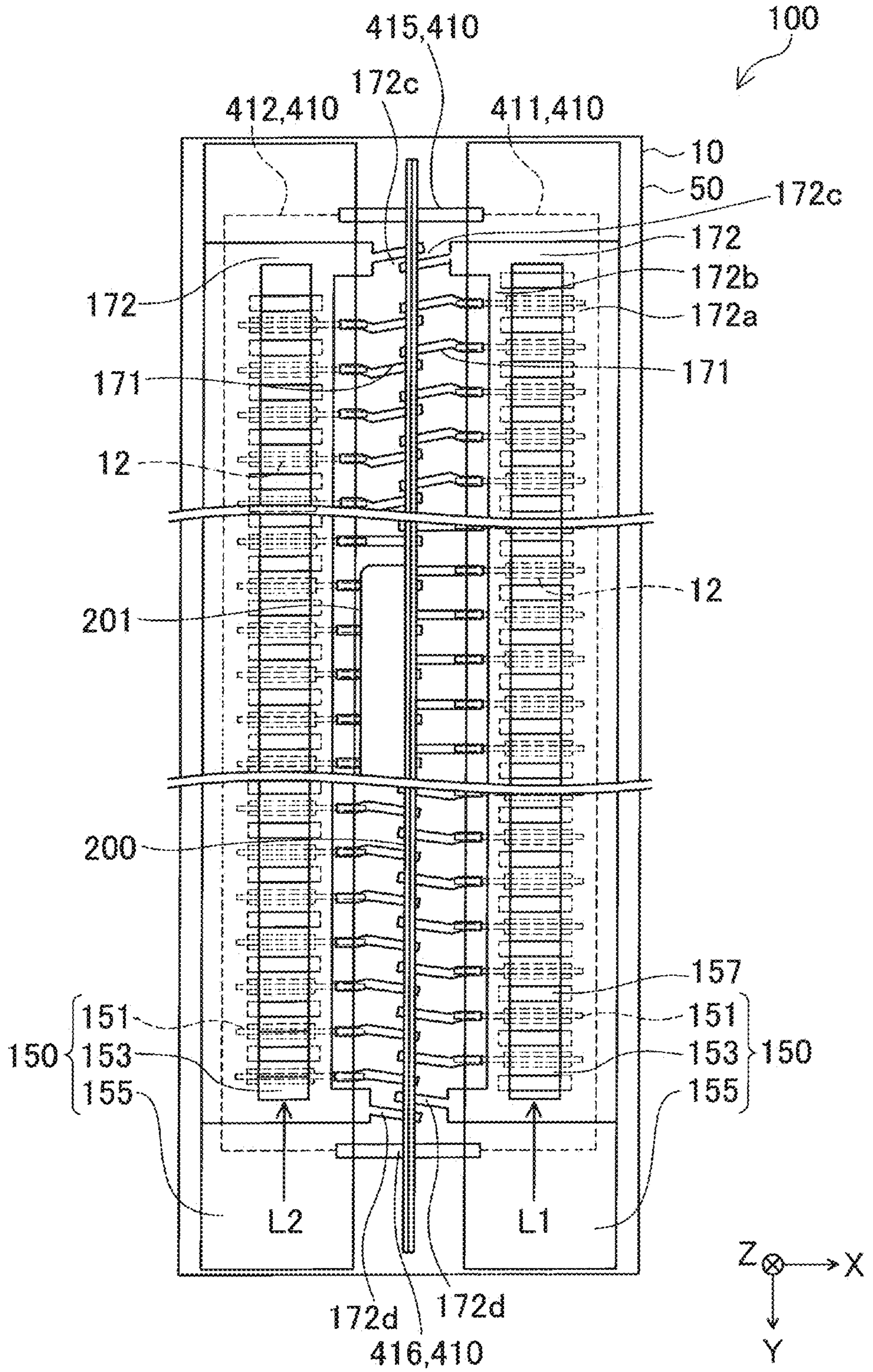
FIG. 9 is an explanatory diagram illustrating a configuration of a liquid ejecting head according to Other Embodiment 6 in plan view.

FIG. 9 is an explanatory diagram illustrating another configuration of the liquid ejecting head 100 in plan view. In the example illustrated in FIG. 9, at the end portion on the +y side and at the end portion on the −y side of the pressure chamber substrate 10, the individual electrodes 171, the coupling portions 172*c*, and the coupling portions 172*d* extend in directions having predetermined inclinations with respect to the x axis. To be more precise, at the end portion on the +y side of the pressure chamber substrate 10, the individual electrodes 171 and the coupling portions 172*d* extend in an axial direction in the case of turning the x axis clockwise by 20 degrees within the xy plane. At the end portion on the −y side of the pressure chamber substrate 10, the individual electrodes 171 and the coupling portions 172*c* extend in an axial direction in the case of turning the x axis counterclockwise by 20 degrees within the xy plane. At a central part in the y-axis direction of the pressure chamber substrate 10, the individual electrodes 171 extend in the x-axis direction.

The present disclosure is not limited to the above-described embodiments and can be realized by various configurations within a range not departing from the gist of the present disclosure. For example, the technical features in the embodiments corresponding to technical features in respective aspects described in the chapter of the summary of the present disclosure may be exchanged or combined as appropriate in order to solve all or part of the above-mentioned problems or to realize all or part of the above-mentioned advantageous effects. Meanwhile, the technical features therein may be deleted as appropriate as long as the relevant technical features are not described as indispensable features in the present specification.

C. Other Aspects (1) An aspect of the present disclosure provides a liquid ejecting head. This liquid ejecting head includes: a pressure chamber substrate including a first pressure chamber line having a plurality of pressure chambers arranged in a first direction, and a second pressure chamber line having a plurality of pressure chambers arranged in the first direction, the first pressure chamber line and the second pressure chamber line being provided in such a way as to be arranged in a second direction intersecting with the first direction; a plurality of individual electrodes individually provided to the respective pressure chambers of the first pressure chamber line and the second pressure chamber line; at least one common electrode provided in common to the respective pressure chambers of the first pressure chamber line and the second pressure chamber line; piezoelectric bodies provided between the plurality of individual electrodes and the at least one common electrode, respectively, and driven in order to apply a pressure to a liquid inside the plurality of pressure chambers; a first detection resistor formed from an identical material to a material of at least any of the plurality of individual electrodes and the at least one common electrode, and designed to change a resistance value depending on a temperature of the liquid inside the plurality of pressure chambers included in the first pressure chamber line; a second detection resistor formed from the identical material to the material of at least any of the plurality of individual electrodes and the at least one common electrode, and designed to change a resistance value depending on a temperature of the liquid inside the plurality of pressure chambers included in the second pressure chamber line; a wiring board; a first coupling terminal that couples one end of the first detection resistor and one end of the second detection resistor in common to the wiring board; and a second coupling terminal that couples another end of the first detection resistor and another end of the second detection resistor in common to the wiring board.

According to this aspect, respective first ends of the first detection resistor to detect the temperature of the first pressure chamber line and of the second detection resistor to detect the temperature of the second pressure chamber line are coupled in common to the wiring board, while respective second ends thereof are coupled in common to the wiring board. That is to say, the first detection resistor and the second detection resistor are coupled in parallel. Accordingly, it is possible to establish wiring of the first detection resistor and the second detection resistor in such a way as to reduce the combined resistance of the first detection resistor and the second detection resistor lower than that in the aspect of coupling the first detection resistor and the second detection resistor in series.

(2) In the liquid ejecting head according to above aspect, the at least one common electrode may include a first common electrode corresponding to the first pressure chamber line and a second common electrode corresponding to the second pressure chamber line, and the liquid ejecting head may further include a third coupling terminal that couples a portion of the first common electrode to the wiring board, and a fourth coupling terminal that couples a portion of the second common electrode to the wiring board.

According to this aspect, by providing the common electrodes individually to the first pressure chamber line and the second pressure chamber line, it is possible to prevent consumption of unnecessary electric power when driving only one of the first pressure chamber line and the second pressure chamber line.

(3) In the liquid ejecting head according to above aspect, the liquid ejecting head may further include: a fifth coupling terminal that couples another portion of the first common electrode to the wiring board; and a sixth coupling terminal that couples another portion of the second common electrode to the wiring board.

(4) In the liquid ejecting head according to above aspect, a distance in the first direction between the first coupling terminal and the third coupling terminal may be shorter than a distance in the first direction between the first coupling terminal and the fourth coupling terminal, and a distance in the first direction between the second coupling terminal and the fifth coupling terminal may be longer than a distance in the first direction between the second coupling terminal and the sixth coupling terminal.

According to this aspect, the distance between the first coupling terminal and the fourth coupling terminal is longer than the distance between the first coupling terminal and the third coupling terminal at the one end portion side in the first direction. Therefore, by setting the distance between the second coupling terminal and the fifth coupling terminal shorter than the distance between the second coupling terminal and the sixth coupling terminal at the other end portion side in the first direction, it is possible to maintain the balance between the influence of the electromagnetic induction noise on the first coupling terminal and the influence of the electromagnetic induction noise on the second coupling terminal.

(5) In the liquid ejecting head according to above aspect, a width in the first direction of the first coupling terminal may be larger than a width in the first direction of the third coupling terminal.

According to this aspect, the width of the first coupling terminal that couples the first resistor and the second resistor to the wiring board in common is increased so as to widen the cross-sectional area of the first coupling terminal. Thus, it is possible to reduce the resistance value of the first coupling terminal.

(6) In the liquid ejecting head according to above aspect, the liquid ejecting head may further include: a first parallel coupling terminal that is coupled in parallel with the first coupling terminal, and couples the one end of the first detection resistor and the one end of the second detection resistor in common to the wiring board; and a second parallel coupling terminal that is coupled in parallel with the second coupling terminal, and couples the other end of the first detection resistor and the other end of the second detection resistor in common to the wiring board.

According to this aspect, the combined resistance of the first coupling terminal and the first parallel coupling terminal can be reduced more than the resistance of the first coupling terminal when using the first coupling terminal alone. The combined resistance of the second coupling terminal and the second parallel coupling terminal can be reduced more than the resistance of the second coupling terminal when using the second coupling terminal alone.

(7) In the liquid ejecting head according to above aspect, the liquid ejecting head may further include: a plurality of seventh coupling terminals that couple the plurality of individual electrodes corresponding, respectively, to the plurality of pressure chambers included in the first pressure chamber line to the wiring board, respectively; and a plurality of eighth coupling terminals that couple the plurality of individual electrodes corresponding, respectively, to the plurality of pressure chambers included in the second pressure chamber line to the wiring board, respectively.

According to this aspect, it is possible to prevent consumption of unnecessary electric power when driving only one of the first pressure chamber line and the second pressure chamber line.

(8) In the liquid ejecting head according to above aspect, a width in the first direction of the first coupling terminal may be larger than a width in the first direction of the seventh coupling terminals.

According to this aspect, the width of the first coupling terminal that couples the first resistor and the second resistor in common to the wiring board so as to widen the cross-sectional area of the first coupling terminal. Thus, it is possible to reduce the resistance value of the first coupling terminal.

(9) In the liquid ejecting head according to above aspect, a length in a direction of extension of the first coupling terminal may be larger than a length in a direction of extension of the third coupling terminal and larger than a length in a direction of extension of the fourth coupling terminal.

According to this aspect, it is possible to reduce the influence of induction noise on the first coupling terminal without forming the third coupling terminal and the fourth coupling terminal unnecessarily long.

(10) In the liquid ejecting head according to above aspect, the at least one common electrode may include a third common electrode that corresponds to both the first pressure chamber line and the second pressure chamber line, and the liquid ejecting head may further include a ninth coupling terminal that couples a portion of the third common electrode to the wiring board.

(11) Another aspect of the present disclosure provides a liquid ejecting apparatus. This liquid ejecting apparatus includes: the liquid ejecting head according to above aspect; a resistance value acquisition unit that acquires a resistance value of combined resistance of the first detection resistor and the second detection resistor through the first coupling terminal and the second coupling terminal; and a temperature acquisition unit that acquires a temperature near the pressure chambers based on the resistance value acquired by the resistance value acquisition unit.

According to this aspect, it is possible to reduce the influence of the noise and to improve temperature detection accuracy.

(12) In the liquid ejecting apparatus according to above aspect, the liquid ejecting apparatus may further include: a drive waveform determination unit that determines a drive waveform to be applied to the plurality of individual electrodes based on the temperature acquired by the temperature acquisition unit.

According to this aspect, it is possible to drive the piezoelectric element depending on the temperature.

(13) In the liquid ejecting apparatus according to above aspect, the liquid ejecting apparatus may further include: a first correspondence relation that represents correspondence between the temperature and the resistance value when driving the first pressure chamber line and the second pressure chamber line; and a second correspondence relation that represents correspondence between the temperature and the resistance value when driving one of the first pressure chamber line and the second pressure chamber line, the temperature acquisition unit may acquire the temperature near the pressure chambers based on the resistance value acquired by the resistance value acquisition unit and on the first correspondence relation when driving the first pressure chamber line and the second pressure chamber line, and the temperature acquisition unit may acquire the temperature near the pressure chambers based on the resistance value acquired by the resistance value acquisition unit and on the second correspondence relation when driving one of the first pressure chamber line and the second pressure chamber line.

According to this aspect, even when driving one of the first pressure chamber line and the second pressure chamber line, the resistance value acquisition unit acquires the combined resistance of the first detection resistor and the second detection resistor. Thus, it is possible to improve temperature detection accuracy by using any of the first correspondence relation and the second correspondence relation.

The present disclosure can be realized not only in the above-described aspect as the liquid ejecting apparatus, but also in various aspects including a liquid ejecting system, a multifunction machine including a liquid ejecting apparatus, and so forth.

What is claimed is:

1. A liquid ejecting head comprising:

a pressure chamber substrate including a first pressure chamber line having a plurality of pressure chambers arranged in a first direction, and a second pressure chamber line having a plurality of pressure chambers arranged in the first direction, the first pressure chamber line and the second pressure chamber line being provided in such a way as to be arranged in a second direction intersecting with the first direction;

a plurality of individual electrodes individually provided to the respective pressure chambers of the first pressure chamber line and the second pressure chamber line;

at least one common electrode provided in common to the respective pressure chambers of the first pressure chamber line and the second pressure chamber line;

piezoelectric bodies provided between the plurality of individual electrodes and the at least one common electrode, respectively, and driven in order to apply a pressure to a liquid inside the plurality of pressure chambers;

a first detection resistor formed from an identical material to a material of at least any of the plurality of individual electrodes and the at least one common electrode, and designed to change a resistance value depending on a temperature of the liquid inside the plurality of pressure chambers included in the first pressure chamber line;

a second detection resistor formed from the identical material to the material of at least any of the plurality of individual electrodes and the at least one common electrode, and designed to change a resistance value depending on a temperature of the liquid inside the plurality of pressure chambers included in the second pressure chamber line;

a wiring board;

a first coupling terminal that couples one end of the first detection resistor and one end of the second detection resistor in common to the wiring board; and a second coupling terminal that couples another end of the first detection resistor and another end of the second detection resistor in common to the wiring board, the first detection resistor and the second detection resistor being coupled to the wiring board in parallel.

2. The liquid ejecting head according to claim 1, wherein the at least one common electrode includes a first common electrode corresponding to the first pressure chamber line and a second common electrode corresponding to the second pressure chamber line, and the liquid ejecting head further includes third coupling terminal that couples a portion of the first common electrode to the wiring board, and a fourth coupling terminal that couples a portion of the second common electrode to the wiring board.

3. The liquid ejecting head according to claim 2, further comprising:

a fifth coupling terminal that couples another portion of the first common electrode to the wiring board; and a sixth coupling terminal that couples another portion of the second common electrode to the wiring board.

4. The liquid ejecting head according to claim 3, wherein a distance in the first direction between the first coupling terminal and the third coupling terminal is shorter than a distance in the first direction between the first coupling terminal and the fourth coupling terminal, and a distance in the first direction between the second coupling terminal and the fifth coupling terminal is longer than a distance in the first direction between the second coupling terminal and the sixth coupling terminal.

5. The liquid ejecting head according to claim 2, wherein a width in the first direction of the first coupling terminal is larger than a width in the first direction of the third coupling terminal.

6. The liquid ejecting head according to claim 2, further comprising:

a first parallel coupling terminal that is coupled in parallel with the first coupling terminal, and couples the one end of the first detection resistor and the one end of the second detection resistor in common to the wiring board; and a second parallel coupling terminal that is coupled in parallel with the second coupling terminal, and couples the other end of the first detection resistor and the other end of the second detection resistor in common to the wiring board.

7. The liquid ejecting head according to claim 1, further comprising:

a plurality of seventh coupling terminals that couple the plurality of individual electrodes corresponding, respectively, to the plurality of pressure chambers included in the first pressure chamber line to the wiring board, respectively; and a plurality of eighth coupling terminals that couple the plurality of individual electrodes corresponding, respectively, to the plurality of pressure chambers included in the second pressure chamber line to the wiring board, respectively.

8. The liquid ejecting head according to claim 7, wherein a width in the first direction of the first coupling terminal is larger than a width in the first direction of the seventh coupling terminals.

9. The liquid ejecting head according to claim 2, wherein a length in a direction of extension of the first coupling terminal is larger than a length in a direction of extension of the third coupling terminal and larger than a length in a direction of extension of the fourth coupling terminal.

10. The liquid ejecting head according to claim 1, wherein the at least one common electrode includes a third common electrode that corresponds to both the first pressure chamber line and the second pressure chamber line, and the liquid ejecting head further includes a ninth coupling terminal that couples a portion of the third common electrode to the wiring board.

11. A liquid ejecting apparatus comprising:

the liquid ejecting head according to claim 1;

a resistance value acquisition unit that acquires a resistance value of combined resistance of the first detection resistor and the second detection resistor through the first coupling terminal and the second coupling terminal; and a temperature acquisition unit that acquires a temperature near the pressure chambers based on the resistance value acquired by the resistance value acquisition unit.

12. The liquid ejecting apparatus according to claim 11, further comprising:

a drive waveform determination unit that determines a drive waveform to be applied to the plurality of individual electrodes based on the temperature acquired by the temperature acquisition unit.

13. The liquid ejecting apparatus according to claim 11, further comprising:

a first correspondence relation that represents correspondence between the temperature and the resistance value when driving the first pressure chamber line and the second pressure chamber line; and a second correspondence relation that represents correspondence between the temperature and the resistance value when driving one of the first pressure chamber line and the second pressure chamber line, wherein the temperature acquisition unit acquires the temperature near the pressure chambers based on the resistance value acquired by the resistance value acquisition unit and on the first correspondence relation when driving the first pressure chamber line and the second pressure chamber line, and the temperature acquisition unit acquires the temperature near the pressure chambers based on the resistance value acquired by the resistance value acquisition unit and on the second correspondence relation when driving one of the first pressure chamber line and the second pressure chamber line.

* * * * *